(12) United States Patent
Kurimoto et al.

(10) Patent No.: US 6,242,533 B1
(45) Date of Patent: Jun. 5, 2001

(54) NOVOLAK TYPE PHENOL RESIN

(75) Inventors: Yoshiaki Kurimoto; Katsuhiro Maruyama; Akira Yoshitomo; Satoru Yoshida; Satoru Kitano, all of Takasaki (JP)

(73) Assignee: Gun Ei Chemical Industry Co., Ltd., Gunma-Ken (JP)

( * ) Notice: Subject to any disclaimer, the term of this patent is extended or adjusted under 35 U.S.C. 154(b) by 0 days.

(21) Appl. No.: 09/584,188

(22) Filed: May 31, 2000

(30) Foreign Application Priority Data

Jun. 4, 1999 (JP) .................................................. 11-158798

(51) Int. Cl.[7] ...................................................... C08L 61/08
(52) U.S. Cl. .............................. 525/135; 525/56; 525/57; 525/132; 525/133; 525/191; 525/328.8; 528/104; 528/129
(58) Field of Search ................................ 525/135, 56, 57, 525/132, 133, 191, 328.8; 528/104, 129, 486

(56) References Cited

U.S. PATENT DOCUMENTS

| | | | |
|---|---|---|---|
| 5,284,930 | * 2/1994 | Matsumoto et al. | 528/482 |
| 5,288,850 | * 2/1994 | Matsumoto et al. | 528/482 |
| 5,350,660 | 9/1994 | Urano et al. | |
| 5,403,695 | 4/1995 | Hayase et al. | |
| 5,468,589 | 11/1995 | Urano et al. | |
| 5,585,218 | 12/1996 | Nakano et al. | |
| 5,679,495 | 10/1997 | Yamachika et al. | |
| 5,962,180 | 10/1999 | Iwanaga et al. | |

* cited by examiner

Primary Examiner—Duc Truong
(74) Attorney, Agent, or Firm—Burns Doane Swecker & Mathis LLP

(57) ABSTRACT

The present invention relates to a novolak type phenol resin, in particular a novolak type phenol resin for resists suitable for forming resist patterns. The novolak type phenol resin of the present invention is obtained by reacting at least a vinylphenol having a vinyl group and a phenolic hydroxyl group, such as parahydroxystyrene, or a polyvinylphenol, which is a polymer of the vinylphenol, a compound (A) such as 4,4'-methylenebis(2-hydroxymethyl-3,6-dimethylphenol) and/or a compound (B) such as 2,6-dihydroxymethyl-4-phenol, in a ratio of 1 to 40 moles of the compound (A) and/or compound (B) to 100 moles of the vinylphenol or 100 moles of structural unit of the vinylphenol contained in the polyvinylphenol in the presence of an acid and having a weight average molecular weight of 2,000 to 20,000. Such a novolak type phenol resin provides good pattern shape, heat resistance, resolution, and sensitivity in resists for lithography.

12 Claims, No Drawings

NOVOLAK TYPE PHENOL RESIN

BACKGROUND OF THE INVENTION

1. Field of the Invention

The present invention relates to a novolak type phenol resin, in particular to a novolak type phenol resin for resists suitable for use in forming resist patterns.

This application is based on Japanese Patent Application No. Hei 11-158798, the contents of which are incorporated herein by reference.

2. Background Art

With the recent high degree of integration of integrated circuits, pattern formation at quarter micron levels has been desired. As a means for achieving downsizing of patterns, mention may be made of a method for shortening the wavelength of the light used. As such, in particular, use of a KrF excimer laser has enabled production of 64M DRAMs and 256M DRAMs and hence has been paid much attention.

Under the circumstances, there has been an increasing demand for resist materials for high resolution lithography and a resist material that shows good pattern formation ability and has improved heat resistance, resolution and sensitivity has been keenly desired.

In accordance with the downsizing of patterns, there has been a shift in the etching process of wafers from wet etching to dry etching. As a result resists are required such that the heat upon dry etching does not deform their patterns, and hence improvement in the heat resistance of resists has been demanded.

Resists must be transparent to the above light source, so mainly polyvinylphenols have been used. However, they are insufficient in pattern shape, resolution, developability, and film retention properties and modification of polyvinylphenols has heretofore been performed. Modification of polyvinylphenols by hydrogenation and modification by various types of copolymerization with styrene monomers, acrylic monomers, etc. have been carried out to promote functionalization of polyvinylphenols. However, in pattern formation at sub-quarter-micron levels, there has been found no resist material that simultaneously satisfies the requirements for good pattern shape, resolution, sensitivity, developability, film retention properties, and heat resistance.

SUMMARY OF THE INVENTION

An object of the present invention is to provide a novolak type phenol resin that gives good pattern shape, heat resistance, resolution, and sensitivity simultaneously in resists for lithography, etc.

As a result of intensive research with a view to achieving the above object, the present inventors have found that polycondensation of a compound (A) represented by the following general formula (I) and compound (B) represented by the following general formula (II) solely or as mixtures with a vinyl phenol or polyvinylphenol (C) can give rise to a phenol resin for resists that combine good resolution, sensitivity, and heat resistance, thus accomplishing the present invention.

That is, the novolak type phenol resin of the present invention is a novolak type phenol resin obtained by reacting at least two components, i.e., a vinyl phenol having a vinyl group and a phenolic hydroxyl group or a polyvinylphenol, which is a polymer of the vinyl phenol, and a compound (A) represented by the following general formula (I) in a ratio of 1 to 40 moles of the compound (A) to 100 moles of the vinylphenol or 100 moles of vinylphenol unit in the polyvinylphenol in the presence of an acid and having a weight average molecular weight of 2,000 to 20,000

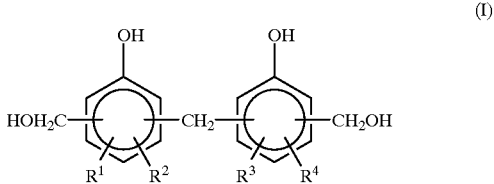

(wherein $R^1$, $R^2$, $R^3$, and $R^4$ independently represent a hydrogen atom, an alkyl group, an alkoxy group, an aryl group, or an aralkyl group).

The novolak type phenol resin of the present invention is also a novolak type phenol resin obtained by reacting at least two components, i.e., a vinyl phenol having a vinyl group and a phenolic hydroxyl group or a polyvinylphenol, which is a polymer of the vinyl phenol, and a compound (A) represented by the following general formula (II) in a ratio of 1 to 40 moles of the compound (B) to 100 moles of the vinylphenol or 100 moles of vinylphenol unit in the polyvinylphenol in the presence of an acid and having a weight average molecular weight of 2,000 to 20,000

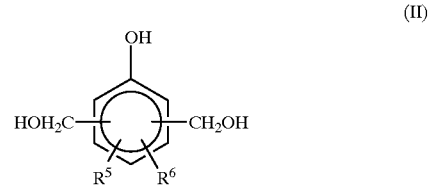

(wherein $R^5$ and $R^6$ independently represent a hydrogen atom, an alkyl group, an alkoxy group, an aryl group, or an aralkyl group).

The novolak type phenol resin of the present invention is also a novolak type phenol resin obtained by reacting at least three components, i.e., a vinyl phenol having a vinyl group and a phenolic hydroxyl group or a polyvinylphenol, which is a polymer of the vinyl phenol, a compound (A) represented by the above general formula (I), and a compound (B) represented by the above general formula (II) in a ratio of 1 to 40 moles of the sum of the compound (A) and compound (B) to 100 moles of the vinylphenol or 100 moles of vinylphenol unit in the polyvinylphenol in the presence of an acid and having a weight average molecular weight of 2,000 to 20,000.

Such novolak type phenol resins can provide pattern shape, heat resistance, resolution, and sensitivity in resists for lithography, etc. and are useful as a light-sensitive resin such as a resist or as a resin precursor for obtaining the light-sensitive resin. Use of the novolak type phenol resin of the present invention enables improvement in the properties of resists. The light-sensitive resin composition comprising the phenol resin of the present invention is excellent in the balance of various properties of resists.

DESCRIPTION OF THE PREFERRED EMBODIMENTS

In the general formulae (I) and (II), the alkyl groups in the substituents $R^1$ to $R^6$ are preferably linear, branched or cyclic and have one or more and 10 or less carbon atoms. As such alkyl groups, mention may be made of, for example, a methyl group, an ethyl group, an isopropyl group, a butyl group, a 2-ethylhexyl group, a cyclohexyl group, etc.

The alkoxy groups in the substituents $R^1$ to $R^6$ preferably have 1 or more and 4 or less carbon groups. As such alkoxy groups, mention may be made of, for example, a methoxy group, a propoxy group, a butoxy group, etc.

The aryl groups in the substituents $R^1$ to $R^6$ include preferably a phenyl group, a naphthyl group, a tolyl group, a cumyl group, etc.

The aralkyl groups in the substituents $R^1$ to $R^6$ preferably have 6 or more and 10 or less carbon atoms. As such aralkyl groups, mention may be made of, for example, a benzyl group, a phenethyl group, etc.

Those preferred as the compound (A) represented by the above general formula (I) include ones in which at least two of $R^1$ $R^2$, $R^3$, and $R^4$ are each an alkyl group having 1 or more and 4 or less carbon atoms and the remaining ones being hydrogen atoms. As such compound (A), mention may be made of, for example, methylenebisphenols having a hydroxymethyl group at the 2- or 6-position with respect to the phenolic hydroxyl group, such as 4,4'-methylenebis(2-hydroxymethyl-3,6-dimethylphenol, 2,2'-methylenebis(6-hydroxymethyl-4-methylphenol).

Those preferred as the compound (B) represented by the above general formula (II) include ones in which one or two of $R^5$ and $R^6$ are each an alkyl group having 1 or more and 4 or less carbon atoms and the remaining ones being hydrogen atoms. As such a compound (B), dihydroxymethylphenol having a hydroxymethyl group at the ortho position with respect to the phenolic hydroxyl group are particularly preferred and mention may be made of, for example, 2,6-hydroxymethyl-4-methylphenol.

The compound (A) and/or compound (B) are reacted (condensed) with the vinylphenol, preferably polyvinylphenol (C), which is a polymer of the vinylphenol. The vinylphenol is a monomer having a vinyl group (preferably, $CH_2$=$CH$—, $CH_2$=$C(CH_3)$—) and a phenolic hydroxyl group. As the vinylphenol, the ones having a vinyl group at the para-position with respect to the phenolic hydroxyl group, represented by the following general formula (III) are preferred

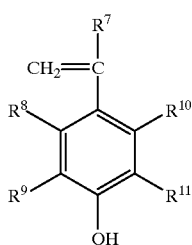

(III)

(wherein $R^7$ is a hydrogen atom or a methyl group, $R^8$, $R^9$, $R^{10}$, and $R^{11}$, which are the same or different, independently represent a hydrogen atom, an alkyl group, an alkoxy group, an aryl group, an aralkyl group, a hydroxyl group or a halogen atom, provided that at least one of $R^9$ and $R^{11}$ is a hydrogen atom).

As the vinylphenol represented by the above general formula (III), mention may be made of, for example, ones having a so-called vinyl group ($CH_2$=$CH$—) in which the substituent alkyl group having 1 to 4 carbon atoms, such as parahydroxystyrene, 4-vinyl-2-methylphenol, 4-vinyl-3-methylphenol, 4-vinyl-2-ethylphenol, and 4-vinyl-3-ethylphenol, the ones having a vinyl group ($CH_2$=$C(CH_3)$—) in which the substituent alkyl group having 1 to 4 carbon atoms, such as 4-isopropenylphenol, 4-isopropenyl-2-methylphenol, 4-isopropenyl-3-methylphenol, and 4-isopropenyl-2-ethylphenol, etc.

The polyvinylphenol (C) is preferably one that is obtained by preliminarily polymerizing the above vinylphenol by radical polymerization, etc., at the site of the double bond and has a weight average molecular weight of about 500 to 10,000, particularly 1,000 to 5,000. The polyvinylphenol (C) is preferably one that is soluble in alcohol-based solvent such as methanol.

As the polyvinylphenol (C), mention may be made of a homopolymer (D) of the above vinylphenol, or a copolymer (E) of the above vinylphenol with other copolymerizable monomer.

As the homopolymer (D) of the vinylphenol, mention may be made of, for example, polyparahydroxystyrene, etc.

As the copolymer (E) of the vinylphenol, mention may be made of those obtained by copolymerizing the vinylphenol with another copolymerizable monomer by radical copolymerization using the vinylphenol in a ratio of about 50 mol % or more, preferably about 60 mol % or more, based on the total number of moles of the vinylphenol and other copolymerizable monomer.

The novolak type phenol resin obtained by reacting the copolymer (E) with the compound (A) and/or compound (B) gives resist patterns excellent in heat resistance, sensitivity and resolution.

As the other copolymerizable monomer, mention may be made of, for example, styrenes, acrylic acid and ester derivatives thereof, α-substituted acrylic acid and ester derivatives thereof. As the styrenes, mention may be made of, for example, styrene, substituted styrenes, etc. As the acrylic acid and ester derivatives thereof, mention may be made of, for example, acrylic acid, methyl acrylate, etc. As the α-substituted acrylic acid and ester derivatives thereof, mention may be made of, for example, methacrylic acid, ethyl methacrylate, tertiary butyl methacrylate, etc.

As the copolymer (E), the copolymers of hydroxystyrenes are preferred. As such copolymer (E), mention may be made of, for example, copolymers obtained by copolymerization of the hydroxystyrene, styrene and (meth)acrylic acid ester. Specific examples thereof include copolymers of hydroxystyrene, styrene, and tertiary butyl methacrylate, etc.

The novolak type phenol resin of the present invention (hereafter, sometimes referred to simply as phenol resin) can be produced by condensing at least two components, i.e., the above vinylphenol or polyvinylphenol (C) and the compound (A), in a ratio of 1 to 40 moles, preferably 2 to 20 moles of the compound (A) per 100 moles of the above vinylphenol or 100 moles of vinylphenol unit contained in the polyvinylphenol (C) in the presence of an acid.

The novolak type phenol resin of the present invention can also be produced by condensing at least two components, i.e., the above vinylphenol or polyvinylphenol (C) and the compound (B), in a ratio of 1 to 40 moles, preferably 2 to 20 moles of the compound (B) per 100 moles of the above vinylphenol or 100 moles of vinylphenol unit contained in the polyvinylphenol (C) in the presence of an acid.

The novolak type phenol resin of the present invention can also be produced by condensing at least three components, i.e., the above vinylphenol or polyvinylphenol (C), the compound (A), and the compound (B), in the presence of an acid. Here, the total mole number of the compound (A) and the compound (B) is in a ratio of 1 to 40 moles, preferably 2 to 20 moles per 100 moles of the above vinylphenol or 100 moles of vinylphenol unit contained in the polyvinylphenol (C).

When at least three components of the compound (A), compound (B), and the vinylphenol or polyvinylphenol (C) are reacted, the compounding ratio of the compound (A) is preferably 50 moles or more per 100 moles of the total mole number of the compound (A) and compound (B).

Upon reacting the compound (A) and/or compound (B) with the vinylphenol or the polyvinylphenol (C) in the presence of an acid, if the ratio of the compound (A) and/or compound (B) per 100 moles of the vinylphenol or 100 moles of vinylphenol unit in the polyvinylphenol (C) is below 1 mole, the improvement that can be expected in the pattern shape of resists may not be large. If the ratio of the compound (A) and/or compound (B) exceeds 40 moles, the decrease in sensitivity is too great to be practical.

The above acid is used as an acid catalyst. As the acid catalyst, mention may be made of, for example, inorganic acids such as hydrochloric acid. Soluble, fusible resins obtained by condensation of phenols with acid catalysts are called novolak type resins.

The novolak type phenol resin of the present invention has a weight average molecular weight (hereafter, referred to as Mw) in the range of 2,000 to 20,000. If the Mw of the phenol resin is below 2,000, it is difficult to obtain resist patterns excellent in heat resistance, etc. If the Mw of the phenol resin is above 20,000, there arises the problem that it is difficult to dissolve in solvents such as ethyl lactate. Condensation time, etc., can adjust the Mw of the phenol resin.

As the method for producing the phenol resin, mention may be made of, for example, a method that comprises charging the compound (A) and/or compound (B) and vinylphenol or polyvinylphenol (C) in a reactor in a compounding mole ratio of (1 to 40):100 and condensing the compound (A) and/or compound (B) with the vinylphenol or polyvinylphenol (C) in a state dissolved in a solvent such as an alcohol-based solvent in the presence of an acid catalyst at a temperature of about 50 to 100° C. Precipitation of the produced phenol resin in water or the like followed by purification and drying the precipitate results in a phenol resin in the form of a powder.

Substituted phenol resins of which about 10 to 50 mol % of the hydroxyl groups of the phenol resin has been substituted by alkoxy groups are preferable as resins for forming resist patterns. Substituted phenol resins have the property of becoming alkali soluble as a result of elimination of alkoxy groups due to acid generated by an photo-acid generator and then elimination of all the alkoxy groups by chemical amplification.

The substituted phenol resin can be obtained in the form of a powder by dissolving an unsubstituted novolak type phenol resin in a solvent (for example, an ester-based solvent such as ethyl acetate), adding to the resulting solution an alkoxylating agent (for example, di-tertiary butyl dicarbonate) and an alkoxylating catalyst (for example, a tertiary amine compound such as triethylamine) to substitute a portion of the phenolic hydroxyl groups into alkoxy groups, precipitating the resulting resin, and purifying and drying the precipitate.

The phenol resin of the present invention is useful as a resin for resists for use in the formation of resist patterns. A resist pattern can be formed, for example, by preparing a resist solution containing the phenol resin of the present invention, an photo-acid generator, and a solvent (for example, ethyl lactate), coating the resist solution on a substrate to form a resist film, exposing the resist film to light and developing it. Such a resist pattern is useful for the production of integrated circuits, etc. Here, as the photo-acid generator, mention may be made of diazo compounds such as bis(cyclohexylsulfonyl)diazomethane.

EXAMPLES

Hereafter, the present invention will be described concretely by examples. In the following examples and comparative examples, all parts are by weight.

Example 1

Production of a Novolak Type Phenol Resin

In a separable flask, 150 g of polyparahydroxystyrene (Mw: 4,000) synthesized by a known method (0.0375 mole as polyparahydroxystyrene [containing 150/120 moles=1.25 moles as parahydroxystyrene unit (molecular weight: 120)]) and 300 g of methanol were charged and polyparahydroxystyrene was dissolved in methanol. After dissolving, 130 g of 35% HCl was added and the resulting mixture was stirred at room temperature. During the stirring, a methanol solution containing 20 g (0.0633 mole) of 4,4'-methylenebis(2-hydroxymethyl-3,6-dimethylphenol) dissolved in methanol in advance was added dropwise over 1 hour at room temperature. After the addition, the temperature was elevated and a reaction was carried out for 8 hours under reflux of methanol. After completion of the reaction, the reaction mixture was cooled down to room temperature and the reaction mixture was added dropwise into 3,000 g of deionized water to precipitate a resin, which was collected by filtration. The collected resin was washed with 1,000 g of deionized water and collected by filtration. This purification step was repeated 5 times. Then, the obtained resin was dried at 40° C. to obtain 160 g of novolak type phenol resin (Mw: 10,000). The MW was measured by gel permeation chromatography (GPC).

In this example, the charged amount of 4,4'-methylenebis (2-hydroxymethyl-3,6-dimethylphenol) was in a ratio of 13.3 parts per 100 parts of polyparahydroxystyrene charged. The mole number (molar ratio) of 4,4'-methylenebis(2-hydroxymethyl-3,6-dimethylphenol), i.e., compound (A), was in a ratio of 5 moles (=0.0633×100/1.25 moles) per 100 moles of the structural unit of parahydroxystyrene in polyparahydroxystyrene.

In the novolak type phenol resin, the structural unit of 4,4'-methylenebis(2-hydroxymethyl-3,6-dimethylphenol) was in a ratio of 5 moles per 100 moles of the structural unit of parahydroxystyrene as in the above charge mole ratio.

Production of Substituted Phenol Resin

The obtained novolak type phenol resin (100 g) was dissolved in 200 g of ethyl acetate, to which 55 g of di-tertiary butyl dicarbonate and 28 g of triethylamine were added and the mixture was reacted for 5 hours under reflux of ethyl acetate. After the reaction, 300 g of ethylene glycol monoethyl ether was added as a solvent and ethyl acetate was removed under reduced pressure. Then, the reaction mixture was added dropwise into 3,000 g of deionized water to precipitate a resin, which was collected by filtration. The collected resin was washed with 1,000 g of deionized water and collected by filtration. This purification step was repeated 5 times. Then, the obtained resin was dried at 40° C. to obtain 120 g of a substituted phenol resin, i.e., the above novolak type phenol resin of which 30 mole % of the phenolic hydroxyl groups was substituted by tertiary butoxy groups.

Formation of Resists Patterns

The obtained substituted phenol resin (100 g) and 5 g of photo-acid generator (bis(cyclohexylsulfonyl) diazomethane) were dissolved in 400 g of ethyl lactate to prepare a resist solution. The resist solution was filtered through a 0.2 μm membrane filter to obtain a resist solution. The resist solution was coated on a silicon wafer (substrate) using a spinner and the coated wafer was dried on a hot plate at 90° C. for 90 seconds to produce a resist film of 0.7 μm in thickness. This film was imagewise exposed to light using a reduced projection aligner and then heated at 110° C. for 90 seconds. Then, it was developed with an aqueous 2.38 wt % tetramethylammonium hydroxide solution for 30 seconds and rinsed with deionized water. The silicon wafer with a resist pattern after the development was left to stand in a clean oven set to various temperatures for 30 seconds and then the resist pattern was observed using a scanning electron microscope to evaluate the shape of the pattern and the like. The results of the observation are shown in Table 1.

Example 2

A novolak type phenol resin (Mw: 9,000) was obtained by repeating the same procedures as in Example 1 except that 10.5 g (0.0625 mole) of 2,6-dihydroxymethyl-4-methylphenol was used instead of 20 g of 4,4'-methylenebis(2-hydroxymethyl-3,6-dimethylphenol) in Example 1. Then, a substituted phenol resin was obtained in the same manner as in Example 1 except that 100 g of this novolak type phenol resin was used instead of 100 g of the novolak type phenol resin in Example 1. A resist pattern was formed in the same manner as in Example 1 except that 100 g of the substituted phenol resin was used instead of 100 g of the substituted phenol resin in Example 1 and the properties of the formed resist pattern were evaluated in the same manner as in Example 1. The results are shown in Table 1.

Example 3

A novolak type phenol resin (Mw: 7,800) was obtained by repeating the same procedures as in Example 1 except that 10 g (0.0316 mole) of 4,4'-methylenebis(2-hydroxymethyl-3,6-dimethylphenol) and 5.2 g (0.0310 mole) of 2,6-dihydroxymethyl-4-methylphenol were used instead of 20 g of 4,4'-methylenebis(2-hydroxymethyl-3,6-dimethylphenol) in Example 1. In this example, the total of the structural units of 4,4'-methylenebis(2-hydroxymethyl-3,6-dimethylphenol), i.e., compound (A), and 2,6-dihydroxymethyl-4-methylphenol, i.e., compound (B) was in a ratio of 5 moles per 100 moles of the structural unit of parahydroxystyrene. Then, a substituted phenol resin was obtained in the same manner as in Example 1 except that 100 g of this novolak type phenol resin was used instead of 100 g of the novolak type phenol resin in Example 1. A resist pattern was formed in the same manner as in Example 1 except that 100 g of the substituted phenol resin was used instead of 100 g of the substituted phenol resin in Example 1 and the properties of the formed resist pattern were evaluated in the same manner as in Example 1. The results are shown in Table 1.

Example 4

A novolak type phenol resin (Mw: 9,000) was obtained by repeating the same procedures as in Example 1 except that 150 g (0.0375 mole as copolymer, or 0.882 mole as parahydroxystyrene unit) of parahydroxystyrene/styrene/tertiary butyl methacrylate copolymer (molar ratio of structural units the copolymer components: 7/2/1, Mw: 4,000) synthesized by a known method was used instead of 150 g of the polyparahydroxystyrene (Mw: 4,000) of Example 1 and that 13 g (0.0451 mole) of 2,2'-methylenebis(6-hydroxymethyl-4-methylphenol) was used instead of 20 g of 4,4'-methylenebis(2-hydroxymethyl-3,6-dimethylphenol) in Example 1. In this example, the mole number of charged 2,2'-methylenebis(6-hydroxymethyl-4-methylphenol) was in a ratio of 5 moles per 100 moles of the structural unit of parahydroxystyrene in the parahydroxystyrene/styrene/tertiary butyl methacrylate copolymer. Then, a substituted phenol resin was obtained in the same manner as in Example 1 except that 100 g of this novolak type phenol resin was used instead of 100 g of the novolak type phenol resin in Example 1 and that 40 g of di-tertiary butyl dicarbonate was used instead of 55 g of di-tertiary butyl dicarbonate in Example 1. A resist pattern was formed in the same manner as in Example 1 except that 100 g of the substituted phenol resin was used instead of 100 g of the substituted phenol resin in Example 1 and the properties of the formed resist pattern were evaluated in the same manner as in Example 1. The results are shown in Table 1.

Comparative Example 1

For comparison with Examples 1, 2 and 3, a polyparahydroxystyrene resin (Mw: 10,000) was synthesized by a known method. A substituted phenol resin was obtained in the same manner as in Example 1 except that 100 g of this polyparahydroxystyrene resin was used instead of 100 g of the novolak type phenol resin of Example 1. A resist pattern was formed in the same manner as in Example 1 except that 100 g of the substituted phenol resin was used instead of 100 g of the substituted phenol resin of Example 1. The properties of the resist pattern were evaluated in the same manner as in Example 1. The results are shown in Table 1.

Comparative Example 2

For comparison with Example 4, a parahydroxystyrene/styrene/tertiary butyl methacrylate copolymer (molar ratio of structural units of the copolymer components: 7/2/1, Mw: 9,000) was synthesized by a known method. A substituted phenol resin was obtained in the same manner as in Example 4 except that 100 g of the parahydroxystyrene/styrene/tertiary butyl methacrylate copolymer was used instead of 100 g of the novolak type phenol resin of Example 4. A resist pattern was formed in the same manner as in Example 1 except that 100 g of the substituted phenol resin was used instead of 100 g of the substituted phenol resin of Example 1 and the properties thereof were evaluated in the same manner as in Example 1. The results are shown in Table 1.

The methods for determining the pattern shape and the like shown in Table 1 were as follows.

Pattern shape: The shape of the resist pattern after heating at 110° C. is shown in a magnified state in Table 1.
Heat resistance: When a resist pattern was heated, the temperature at which the resist pattern showed thermal deformation is shown in Table 1.
Sensitivity: Light exposure at which a 0.25 μm line and space were resolved at 1:1 is shown in Table 1 as the optimal exposure (Em).
Resolution: At the light exposure at which a 0.25 μm line and space were resolved at 1:1, the minimum line width of a separated line and space was defined as the resolution of the evaluated resist.

TABLE 1

| | Pattern shape | Heat resistance (° C.) | Sensitivity (mJ/cm²) | Resolution (μm) |
|---|---|---|---|---|
| Example 1 | rectangular | 135 | 31 | 0.20 |
| Example 2 | rectangular | 135 | 35 | 0.22 |
| Example 3 | rectangular | 130 | 38 | 0.22 |
| Example 4 | rectangular | 130 | 42 | 0.20 |
| Comparative Example 1 | rounded | 135 | 50 | 0.22 |
| Comparative Example 2 | rounded | 130 | 52 | 0.22 |

The mole number of charged compound (A), the mole number of charged compound (B), the mole number of the structural unit of vinylphenol in the polyvinylphenol (C), the ratio of the mole number of charged compound (A) and compound (B) per 100 moles of the structural unit of the vinylphenol, and the Mw of the obtained novolak type phenol resin upon production of a novolak type phenol resin for Examples 1 to 4 are shown in Table 2.

TABLE 2

| | Mole number of compound (A) | Mole number of compound (B) | Mole number of structural unit of vinylphenol | Molar ratio of compound (A) | Molar ratio of compound (B) | Mw of novolak type phenol resin |
|---|---|---|---|---|---|---|
| Example 1 | 0.0633 | — | 1.25 | 5 | — | 10,000 |
| Example 2 | — | 0.0625 | 1.25 | — | 5 | 9,000 |
| Example 3 | 0.0316 | 0.0310 | 1.25 | 2.5 | 2.5 | 7,800 |
| Example 4 | 0.0451 | — | 0.882 | 5 | — | 9,000 |

Table 1 indicates that the resist patterns of Examples 1 to 4 are superior to the resist patterns in Comparative Examples 1 and 2 in heat resistance without showing rounded corners of the top portion of the resist pattern, and also in sensitivity and resolution. The resist patterns of Examples 1, etc. are summarized as follows.

Resist pattern of Example 1: Resist pattern using the substituted phenol resin obtained by co-condensing the compound (A) and the homopolymer of vinylphenol and alkoxylating the co-condensation product.

Resist pattern of Example 2: Resist pattern using the substituted phenol resin obtained by co-condensing the compound (B) and the homopolymer of vinylphenol and alkoxylating the co-condensation product.

Resist pattern of Example 3: Resist pattern using the substituted phenol resin obtained by co-condensing the compound (A), the compound (B), and the homopolymer of vinylphenol and alkoxylating the co-condensation product.

Resist pattern of Example 4: Resist pattern using the substituted phenol resin obtained by co-condensing the compound (A) and the parahydroxystyrene/styrene/tertiary butyl methacrylate copolymer (copolymer of vinylphenol) and alkoxylating the co-condensation product.

Resist pattern of Comparative Example 1: Resist pattern using the substituted phenol resin obtained by alkoxylating the homopolymer of vinylphenol.

Resist pattern of Comparative Example 2: Resist pattern using the substituted phenol resin obtained by alkoxylating the parahydroxystyrene/styrene/tertiary butyl methacrylate copolymer.

What is claimed is:

1. A novolak type phenol resin obtained by reacting at least two components, i.e., a vinylphenol having a vinyl group and a phenolic hydroxyl group or a polyvinylphenol, which is a polymer of the vinylphenol, and a compound (A) represented by the following general formula (I) in a ratio of 1 to 40 moles of the compound (A) to 100 moles of the vinylphenol or 100 moles of vinylphenol unit in the polyvinylphenol in the presence of an acid and having a weight average molecular weight of 2,000 to 20,000

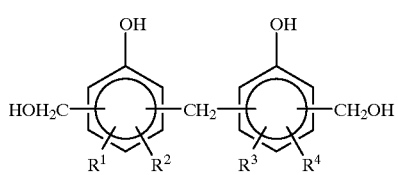

(I)

(wherein $R^1$, $R^2$, $R^3$, and $R^4$ independently represent a hydrogen atom, an alkyl group, an alkoxy group, an aryl group, or an aralkyl group).

2. The novolak type phenol resin as claimed in claim 1, wherein the polyvinylphenol is a homopolymer of the vinylphenol, or a copolymer of at least one monomer selected from the group consisting of styrenes, acrylic acid, α-substituted acrylic acid and ester derivatives thereof with the vinylphenol.

3. A novolak type phenol resin comprising the novolak type phenol resin of claim 1, wherein at least a portion of hydroxyl groups of the phenol resin is substituted by alkoxy groups.

4. The novolak type phenol resin as claimed in claim 1, wherein the novolak type phenol resin is a resin for resists.

5. A novolak type phenol resin obtained by reacting at least two components, i.e., a vinylphenol having a vinyl group and a phenolic hydroxyl group or a polyvinylphenol, which is a polymer of the vinylphenol, and a compound (B) represented by the following general formula (II) in a ratio of 1 to 40 moles of the compound (B) to 100 moles of the vinylphenol or 100 moles of vinylphenol unit in the polyvinylphenol in the presence of an acid and having a weight average molecular weight of 2,000 to 20,000

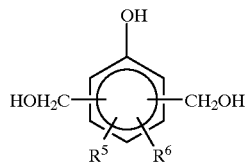

(II)

(wherein $R^5$ and $R^6$ independently represent a hydrogen atom, an alkyl group, an alkoxy group, an aryl group, or an aralkyl group).

6. The novolak type phenol resin as claimed in claim 5, wherein the polyvinylphenol is a homopolymer of the vinylphenol, or a copolymer of at least one monomer selected from the group consisting of styrenes, acrylic acid, α-substituted acrylic acid and ester derivatives thereof with the vinylphenol.

7. A novolak type phenol resin comprising the novolak type phenol resin of claim 5, wherein at least a portion of the hydroxyl groups of the phenol resin is substituted by alkoxy groups.

8. The novolak type phenol resin as claimed in claim 5, wherein the novolak type phenol resin is a resin for resists.

9. A novolak type phenol resin obtained by reacting at least three components, i.e., a vinylphenol having a vinyl group and a phenolic hydroxyl group or a polyvinylphenol, which is a polymer of the vinylphenol, a compound (A) represented by the general formula (I)

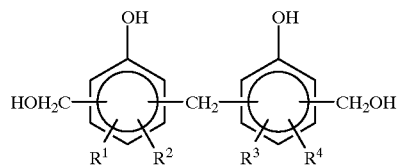

(I)

(wherein $R^1$, $R^2$, $R^3$, and $R^4$ independently represent a hydrogen atom, an alkyl group, an alkoxy group, an aryl group, or an aralkyl group), and a compound (B) represented by the general formula (II)

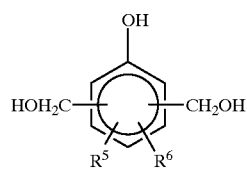

(II)

(wherein $R^5$ and $R^6$ independently represent a hydrogen atom, an alkyl group, an alkoxy group, an aryl group, or an aralkyl group) in a ratio of 1 to 40 moles of the total mole number of the compound (A) and compound (B) to 100 moles of the vinylphenol or 100 moles of vinylphenol unit in the polyvinylphenol in the presence of an acid and having a weight average molecular weight of 2,000 to 20,000.

10. The novolak type phenol resin as claimed in claim 9, wherein the polyvinylphenol is a homopolymer of the vinylphenol, or a copolymer of at least one monomer selected from the group consisting of styrenes, acrylic acid, α-substituted acrylic acid and ester derivatives thereof with the vinylphenol.

11. A novolak type phenol resin comprising the novolak type phenol resin of claim 9, wherein at least a portion of the hydroxyl groups of the phenol resin is substituted by alkoxy groups.

12. The novolak type phenol resin as claimed in claim 9, wherein the novolak type phenol resin is a resin for resists.

\* \* \* \* \*